Feb. 25, 1947.   R. F. COLEMAN   2,416,570
FORCE SYSTEM
Filed Dec. 2, 1942   3 Sheets-Sheet 1

INVENTOR.
Roy F. Coleman
BY
Howard J Churchill
ATTORNEY

Feb. 25, 1947.  R. F. COLEMAN  2,416,570
FORCE SYSTEM
Filed Dec. 2, 1942  3 Sheets-Sheet 3

INVENTOR.
Roy F. Coleman
BY
Howard J. Churchill
ATTORNEY

Patented Feb. 25, 1947

2,416,570

UNITED STATES PATENT OFFICE 2,416,570

FORCE SYSTEM

Roy F. Coleman, New York, N. Y.

Application December 2, 1942, Serial No. 467,613

12 Claims. (Cl. 267—1)

The present invention provides a force system, which is intended primarily to form part of instruments of various types, for measuring or controlling unknown unbalanced forces.

More particularly, the present invention provides a force system which is adapted to oppose an applied unknown force and to measure or control it by creating in the force system an opposing force which will exactly balance the unknown force and establish with it a state of equilibrium. The opposing or balancing force is built up in the force system by means of a compressible fluid under pressure which is admitted to the system through a pilot valve. The magnitude of the unknown force is determined by the relationship which it bears to the magnitude of the known force of fluid pressure required to balance it. With this type of force system, an increase or decrease in the magnitude of the force being measured will cause a proportionate increase or decrease in the balancing fluid pressure, thus permitting of accurate force measurement through a direct-reading gauge.

It is preferable in such instruments that the movement of the mechanical parts of the force system should be limited to small fractions of one inch to avoid common mechanical errors due to friction losses, fatigue of metals, etc. In the preferred form of the invention herein illustrated the movement of the mechanical parts of the force system is limited to .002 inch—thus rendering the common mechanical errors practically negligible.

The pressure fluid which is relied upon in the force balancing unit must be a compressible fluid, such for instance as air, so as to permit the establishment of a wide range of fluid pressures with substantially constant volume. For convenience in the following description, the force system shall be described as utilizing compressed air, but it will be understood that any compressible fluid may be utilized.

One of the features of the present invention resides in the provision of a novel force system designed and constructed to oppose and balance an unknown force, and to measure or control the same without appreciable movement of mechanical parts in the force system.

A second feature of novelty resides in the provision of a force system of the type described wherein the air pilot is disposed in axial alignment with the system and is in the direct line of application of the unknown force. In this way the unknown force is made to control directly the admission or exhaust of pressure fluid, to create and maintain a suitable balancing pressure.

Another feature of the present invention resides in the provision of a force system of the type described which is especially adapted for handling pulsating forces. According to the present invention, the unknown, unbalanced force is transmitted to a movable partition member which forms part of a compression-fluid balancing chamber. Relative movement of the partition will unseat one of two valves to admit more pressure fluid into the balancing chamber or to exhaust some therefrom until a state of equilibrium is re-established. To prevent sudden movements of the movable partition under the impacts of a pulsating force, I provide a pair of liquid-filled chambers of over-all constant volume, which serve to dampen out the pulsations by impeding or slowing up the movements of the movable partition. The two liquid-filled chambers are in liquid communication with each other through a reduced orifice. They are so constructed that movements of the movable partition will cause one chamber to expand and the other to contract simultaneously, thereby causing liquid to flow from the latter to the former through the reduced orifice. The speed of movement of the movable partition, therefore, is made dependent upon the rate of liquid flow between the two liquid-filled chambers. The present invention also provides an adjustable valve for varying the orifice opening between the liquid-filled chambers, as desired, to regulate the rate of flow between them and to compensate for the pulsating character of an applied force. When a uniform force is applied, the orifice may be opened wider to avoid unnecessarily slowing up the responsive or balancing action.

Another feature of the invention resides in the provision of a novel lever system with adjustable fulcrum for changing the range of the force system without effecting a change in the operating fluid pressure range, whereby it is possible to measure large forces with relatively small fluid pressures; or conversely, to measure smaller forces with the same fluid pressure range. This feature possesses the distinct advantage that it may be utilized for the purpose of multiplying or dividing the magnitude of the force being measured to bring it within the operating range of the force system. The invention also contemplates that the range of the unit may be varied by varying the operating fluid pressure range.

Other features of novelty include mechanically adjustable means built into the force system for zeroing the instrument of which the force system will form a part.

The foregoing and other features of novelty are included in the force systems illustrated in the accompanying drawings, which show systems constructed according to the present invention and embodied in one typical application, i. e. a liquid level instrument for indicating or controlling liquid level within a pressure vessel. It will be understood, of course, that the invention is not limited to this one typical application, but may be embodied in various other types of instruments wherein an unknown force may be applied to a force system and balanced thereby.

Figures 1, 2:
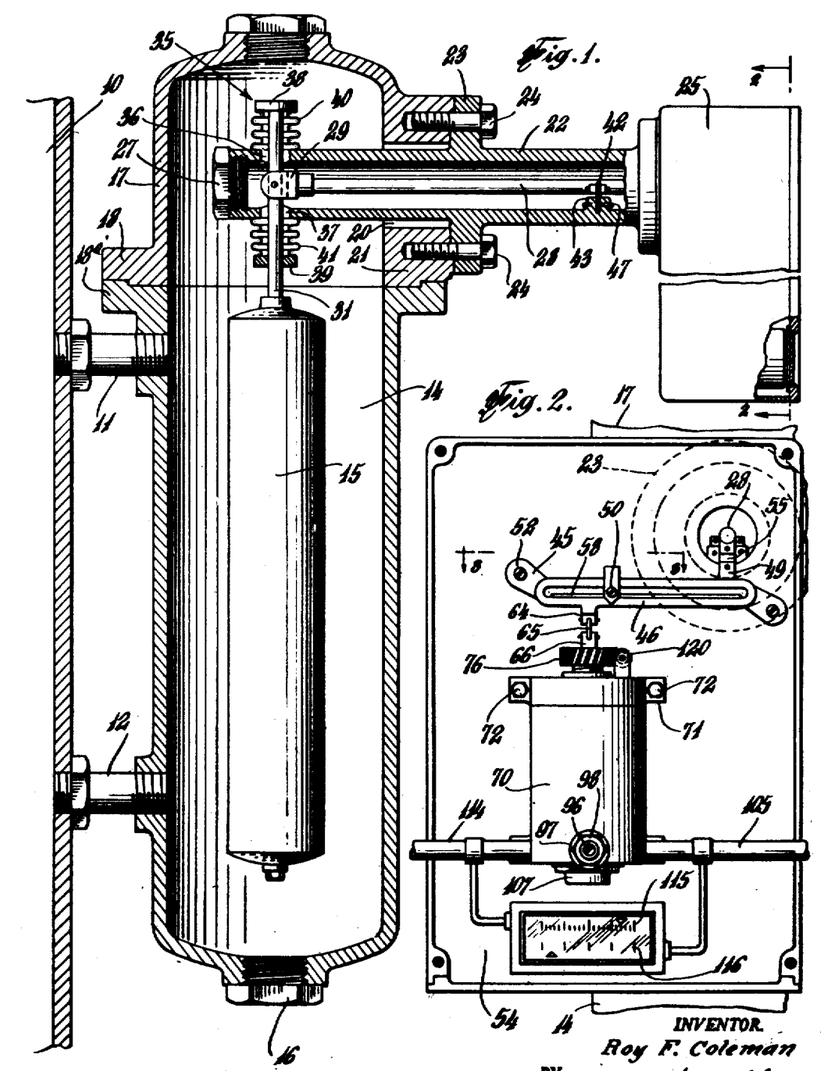
Figure 1 is a fragmentary sectional view of a ball-float chamber attached to a pressure vessel for indicating the liquid level therein, and to which an instrument embodying the force system of the present invention has been applied for measuring at all times the level of the liquid in the pressure vessel.
Fig. 2 is an enlarged view of the measuring instrument with the front panel removed, and viewed in the direction of the arrows in Fig. 1.

Referring now to the drawings in more detail, a liquid-containing pressure vessel 10 is provided in its wall with upper pipes 11, 12 connecting the vessel with a cylindrical float chamber 14. Positioned within the float chamber is an elongated float or fluid displacement member 15 having a predetermined volume. The cylindrical float chamber, as shown, comprises a lower body portion provided at its base with a threaded aperture suitably closed by a removable plug 16. The upper section of the float chamber comprises a head portion 17 suitably fastened to the body by flanges 18, 18a having bolts therethrough (not shown). The head 17 is provided with an opening 20 having a surrounding flange 21. A tubular member 22 is disposed within the opening 20 and is provided with a cooperating and complemental flange 23 which is suitably secured to the flange 21 by bolts 24. The tubular member 22 supports at its outer end an instrument case 25 containing a liquid level measuring instrument embodying the novel force system of the present invention. The inner end of the tubular member 22 is suitably sealed by a removable plug 27 screwed therein.

Disposed axially within member 22 is a pivoted lever 28, having a forked end 29 suitably pinned to the stem 31 of the ball float 15. Surrounding the stem 31, as shown, is what I prefer to call a "floating gland" 35, which serves effectively to seal the fluid under pressure in the vessel 10 from escape to atmosphere through the tubular member 22, while transmitting to the outside of said pressure vessel the limited vertical movements of the stem 31 with rise or fall of liquid level in the float chamber 14.

The floating gland, as shown, represents an effective way of transmitting motion from inside a pressure vessel to the outside, without using a pressure-type bearing or a stuffing box. In the embodiment shown, the movable stem 31 extends through upper and lower holes 36, 37 provided in the tubular member 22. The stem has a pair of spaced discs 38, 39 secured to it, which are of equal diameter and are equally spaced along the stem from the pivot pin. A bellows diaphragm 40 surrounds the stem and is secured to the peripheries of the hole 36 and disc 38 to provide a flexible seal between the pressure vessel and the inside of the tubular member. A second bellows 41 is axially aligned with the first bellows 40 but is oppositely disposed. It is secured to the peripheries of the hole 37 and the disc 39. With vertical movements of the ball float 15 and stem 31, one of the bellows 40, 41 will contract slightly and the other will expand, permitting motion of the float and stem to be transmitted to the outside through stem 31 connected to lever 28 while still sealing the chamber 14 from the atmosphere. It should be noted, furthermore, that the gland has been so designed that the internal high pressure acting downwardly on the upper bellows 40 is balanced by the pressure acting upwardly on the lower bellows 41. Thus, no correction needs to be made for variations in fluid pressure within the chamber 14. The upward pressure on bellows 41 will always equal and balance the downward pressure on the bellows 40.

The lever 28 is mounted for limited pivotal movement about its fulcrum 42 with rise and fall of liquid level in the ball-float chamber 14. The lever 28 extends into the instrument case 25 where it is attached to the lever 45 forming part of the force system provided by the present invention. It will be noted that the fulcrum 42 comprises an upstanding flexible strip which has been cut out to accommodate the lever 28. It is supported at its lower end in a slot provided in boss 43 formed on the inner face of the tubular member 22, and having retaining pins 47 therethrough. The upper ends of the flexible strip are clamped between a pair of strap flanges on the lever 28 which are pulled into clamping engagement with the strips 42 by a pair of screw-threaded bolts.

Figure 7:
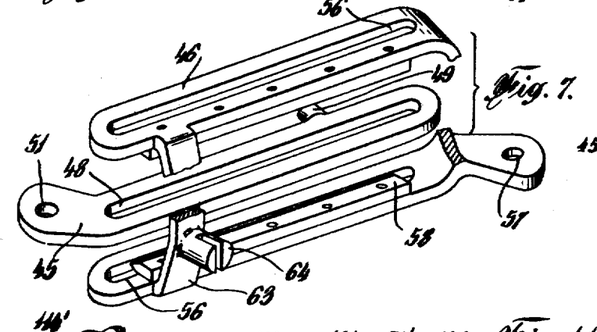
Fig. 7 is a fragmentary perspective view showing details of construction of the levers forming part of the lever system for changing the range of the instrument.
Figure 8:
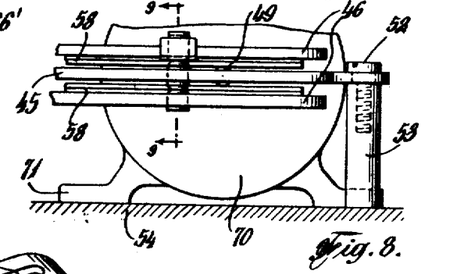
Fig. 8 is a fragmentary end view of the pivoted levers and force system housing taken substantially on the line 8—8 in Fig. 2.
Figure 9:
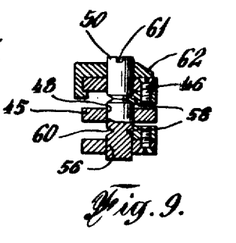
Fig. 9 is an enlarged cross-sectional view of the levers and movable pivot taken on the line 9—9 of Fig. 8, and revealing details of construction.

As previously stated, the lever 28 extends into instrument case 25 where it is connected to lever 45 forming part of the force system provided by the present invention. Lever 45 is one of a pair of cooperating levers 45, 46 which constitute part of the range-changing device. As seen in Figs. 2 and 7, lever 45 is a single lever having an elongated slot 48 for accommodating a fulcrum element 50 (Fig. 9). It has a hole 51 for receiving a pivoting stud bolt 52 screwed into a supporting post 53 which spaces the lever in front of the vertical base plate 54 of the instrument case 25. A boss 49 is formed integrally on one edge of the lever 45, as shown, with a slot therein for accommodating a flexible metallic strip 55 suitably pinned to connect it with lever 28.

The lever 46 is forked, as shown, and is provided with an elongated slot 56 in each leg to accommodate the fulcrum element 50. The forked lever 46 is pivoted at 57 and supported on the base plate in like manner to lever 45. Each leg of the forked lever 46 has a knife-edge member 58 riveted to it along its lower inner face, with the knife edges overlying the slots 56, as shown. It will be particularly noted in Fig. 9 that the fulcrum element 50 is of suitable diameter to be accommodated in the longitudinal slots 48, 56 of the levers 45, 46 and that the fulcrum element has been provided with a pair of V-shaped grooves 60 to accommodate the knife edges 58. A screw-driver slot 61 in the fulcrum element facilitates rotation about its axis, and a pointer 62 on the fulcrum head moves across the visible face of the lever 46 to indicate at all times the position of the movable fulcrum 50.

It will be observed that a depending yoke 63 is provided near the open end of the forked lever 46, and that the yoke has a boss 64 accommodating a metallic strip 65 connecting the lever 46 with a tubular shaft 66. The tube 66 is axially movable with an increase or decrease in force exerted against it by the lever 46, and forms part of the force-balancing unit for creating a fluid pressure to oppose, balance and measure the externally-applied force of the movable ball float. This unit will shortly be described.

Lever 45 is adapted to be pivoted about its pivot point 51, and lever 46 is adapted to pivot about point 57. Both levers are fulcrumed about the element 50. A rise in liquid level in chamber 14 tends to cause the float to rise and to exert an upward force on lever 28 which is transmitted past fulcrum point 42 to exert a downward force against lever 45 at 49. This force, in turn, is exerted as a downward force of different magnitude (depending on the respective lever arms) against the tubular shaft 66 of the force-balancing unit. The effective length of lever 45 is from the point 49 to the fulcrum 50; whereas the effective length of lever 46 is from the point 64 to the fulcrum 50. Thus, it will be understood that in accordance with the well-known laws of levers, the magnitude of the force required to balance an externally-applied force will depend upon the lever arm lengths. It will be understood, therefore, that the same balancing force may be utilized to handle larger or smaller forces merely by shifting the fulcrum 50 laterally along slots 48 and 56, by rotating the screw head 61 in a clockwise direction to move the fulcrum to the right in Fig. 2, and in a counterclockwise direction to move the fulcrum to the left.

Figure 10:
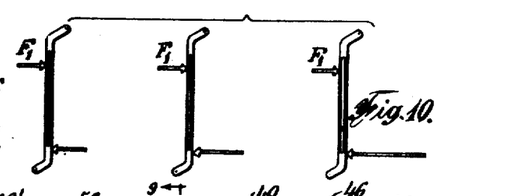
Fig. 10 is a diagrammatic illustration of the pivoted levers with the fulcrum point in three different positions, and illustrates with vector arrows the magnitude of various forces which may be balanced and measured with a constant fluid pressure.

In Fig. 10 there are illustrated force diagrams which show quite graphically the range-changing possibilities of the present construction with the movable fulcrum point shown in three different positions. A constant force $F_1$ is utilized to balance three forces of differing magnitude, by shifting the position of the fulcrum point 50 to change the effective lever arms.

Figures 3, 4, 5, 6:
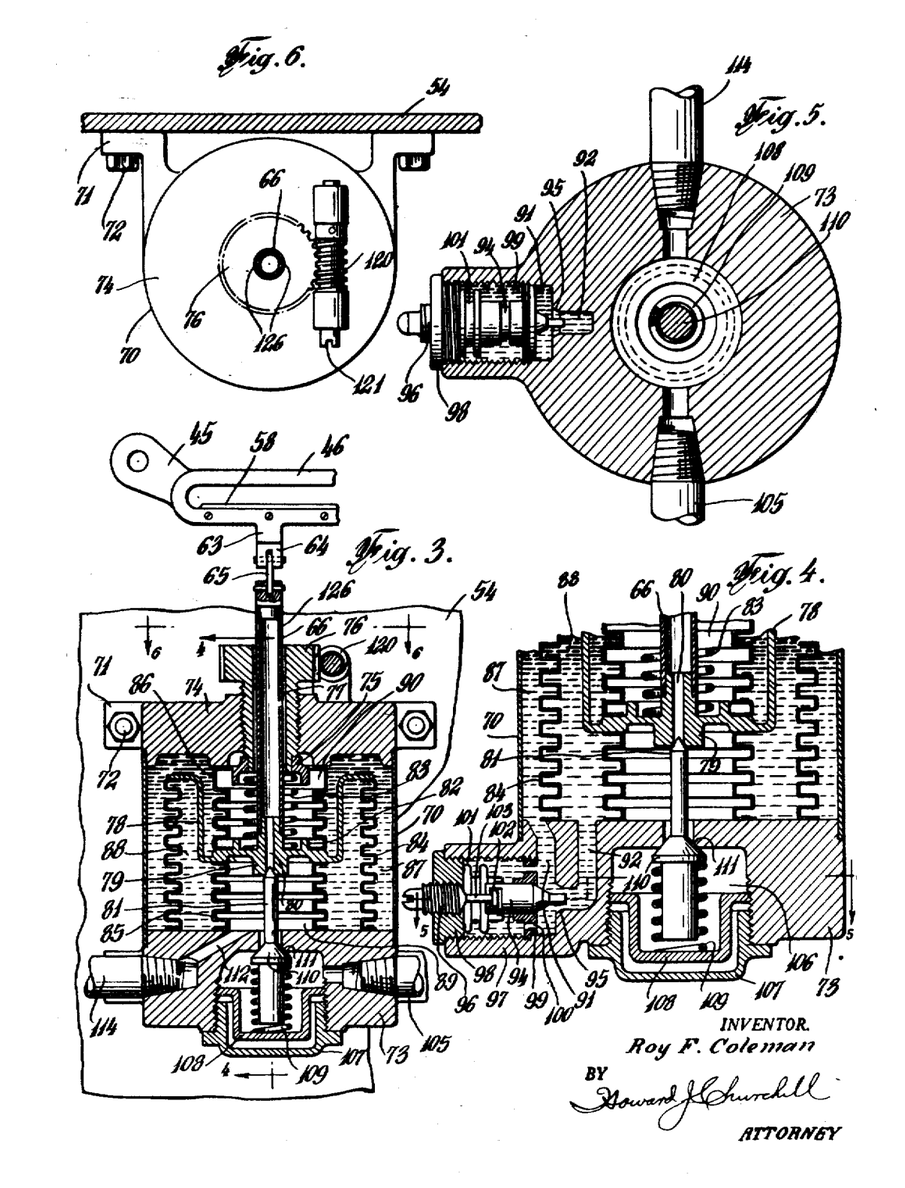
Fig. 3 is a fragmentary, axial, sectional view of the force system forming part of the instrument illustrated in Fig. 2.
Fig. 4 is a fragmentary axial section of the force system of Fig. 3 taken on the line 4—4 of this figure when viewed in the direction of the arrows.
Fig. 5 is a horizontal section through Fig. 4 taken on the line 5—5.
Fig. 6 is a section taken on the line 6—6 in Fig. 3, when viewed in the direction of the arrows, and shows in detail the worm and gear mechanism forming part of the zero adjustment means.

The force-balancing unit of the present invention is contained in a cylindrical housing 70 having attaching feet 71 suitably fastened to the base plate 54 by means of bolts 72. As best seen in Figs. 3 and 4, one end of the cylindrical casing is closed by a lower head or base 73 containing a pilot-valve and the upper end of the cylinder is closed by a head 74. The upper head 74 has an enlarged screw-threaded axial bore therethrough into which has been screwed a support for a coil-spring retaining cup member 75. The support has an integrally formed gear 76 on its outer end, for a purpose presently to be made apparent.

The member 75 and gear 76 have an axial bore 77 therethrough which is of slightly larger diameter than the outer diameter of the tubular shaft 66, slidable therein, so as to permit the escape of air past the tube to atmosphere. Permanently fastened to the inner end of the tubular shaft 66 is a substantially rigid cup-shaped partition member 78. The partition member 78 is provided with a central boss 79 having a vent port 80 therethrough closed by a valve member 81 having an elongated spindle. Inwardly on the cup member 78 is struck up an annular flange 82 which provides a confining seat for coil-spring 83.

Secured to the base 73 and head 74 and to the cup-shaped partition member 78 are three cylindrical bellows diaphragms which define three distinct chambers or compartments which are sealed from each other (except for channels provided in the pilot-control head 73). One bellows 84 is secured to the outer lip of the cup-shaped member 78 and to the base 73. A second bellows 85 is disposed inwardly of the large bellows 84 and is secured to the cup-shaped member 78 and the base 73, as shown. The third bellows 86 is disposed in axial alignment with the bellows 85, but on the opposite side of the partition 78 and is fastened to the upper head 74 and the partition 78.

It will, thus, be seen that one chamber 87 is defined by the cylindrical wall of the housing 70, the outer surface of the large bellows 84, part of the inner face of the cup-shaped member and the outer surface of the bellows 86. A second chamber 88 is defined by the inner face of the large bellows 84, the partition 78 and the outer face of bellows 85. A third chamber (compressible fluid chamber) 89 is defined by the inner surfaces of the bellows 85, the base 73 and the cup-shaped partition member 78. What might be considered a fourth compartment 90 is defined by the inner surfaces of the bellows 86. But, as previously stated, this compartment is in constant communication with the atmosphere through enlarged bore 77 surrounding shaft 66. The partition 78 in effect constitutes two partitions secured to the tubular shaft 66 and movable simultaneously therewith. One partition (the cup-like flange part of member 78) separates chambers 87 and 88. The other partition separates the compressible-fluid balancing chamber 89 and compartment 90.

It is a feature of the present invention that the chambers 87 and 88 are liquid filled, as shown, and are in communication with each other only through small channels 91, 92 provided in the lower head 73.

The present invention also provides an adjustable orifice valve 94 for varying the orifice connecting channels 91 and 92, whereby to limit the rate of liquid flow between chambers 87 and 88.

The orifice has a valve seat 95 to accommodate a tapering valve member 94, which is movable toward or away from the valve seat by a screw 96. It will be observed that the entire orifice valve mechanism is contained in a valve body 97 formed as a part of the pilot-valve head 73. The valve body is suitably closed by a screw plug 98 containing the screw 96 for adjusting the position of valve 94. The valve is slidable in a guide member 99, having holes 100 therein to permit liquid from channel 91 to flow through. A small bellows 101 secured to the inner face of plug 98 and to the valve 94, as shown, seals the liquid against leakage. The valve member 94 has a transverse slot 102 which loosely accommodates an enlarged head on pin 103 formed integrally with screw 96. As screw 96 is turned inwardly or outwardly, it moves valve member 94 relatively to the seat 95 to vary the orifice opening between channels 91 and 92.

Disposed axially in line with the movable tubular member 66 and partition 78 of the force system, is the "in line" pilot-valve mechanism of the present invention. This construction possesses the advantage that the externally-applied force acts directly and axially to open or close the pilot valves, to admit or exhaust air to or from the compressible-fluid balancing chamber 89, as the partition 78 and tubular member 66 are displaced from their neutral position.

The pilot-valve mechanism comprises a connection 105 to a suitable source of fluid under pressure (preferably compressed air) communicating with the valve chamber 106. The latter is closed by a screw-threaded plug 107. Spaced inwardly of the plug 107 is a retaining cup-shaped member 108 for valve spring 109. The cup-shaped member 108 may be screwed further into or out of the valve chamber to permit of a slight adjustment of spring tension on the valve. The spring surrounds the stem of a valve 110 and normally urges it into closed position with the valve seat 111. The valve 110 is formed integrally with the elongated spindle of valve 81 for movement therewith.

When the valve 110 is unseated, compressed air is admitted to chamber 89. A passage 112 connects chamber 89 with connection 114 leading to a pressure gauge 115 for registering at all times the air pressure in chamber 89. A second gauge 116 indicates at all times the line air pressure available, which, of course, as shown, will exceed the pressure in the chamber 89. The line 114 also may be directed to a remote receiver indicator, or to a control valve (when used as a controller) for regulating flow of liquid from the vessel when predetermined pressures exist in the chamber 89.

Operation.—Referring now to Figs. 1, 2, 3 and 4, before liquid is admitted to the vessel 10 and float chamber 14, the weight of the ball float 15 normally tends to pull down on the lever 28 and to raise its point of connection 55 with the lever 45. This, in turn, exerts an upward force on the lever 46, tending to pull the tubular shaft 66 of the force system upwardly, as seen in Fig. 3. This force, however, is opposed by an initial tension imposed upon coil-spring 83 which is so adjusted as to balance the weight of the ball float and associated parts, and preferably also a two-pound initial air pressure in chamber 89. When the tension on coil-spring 83 is so adjusted, the instrument of which the force system forms a part will be in proper zero position.

A convenient and simple mechanism for accurately zeroing the instrument is provided by the present invention through the medium of a spring-tension-adjustment mechanism comprising a worm gear 120 meshing with gear 76. The worm 120 may be turned manually with a screwdriver-entering slot 121. The worm will rotate gear 76 which, in turn, will screw the cup-shaped member 75 further into the upper head 74 to place a greater initial tension on the spring 83. If a lesser initial tension is required, the cup member 75 may be screwed outwardly. It will also be apparent that the required initial spring tension will vary with different positions of the movable fulcrum element 50. These variations in required tension may be compensated for by adjusting the worm 120 and gear 76 in like manner.

When liquid is admitted to the vessel and enters the ball-float chamber 14, it will tend to raise the ball float 15, which will exert a downward force on lever 28 at its point of connection 55 with lever 45. This force, in turn, will be applied in a downward direction at point 65 and in a magnitude which will depend upon the effective lever arm lengths determined by the position of the fulcrum element 50. Lever 46 will then force tubular shaft 66 downwardly, unseating pilot-valve 110 from the seat 111, and admitting compressed air into the compressible fluid chamber 89. The air pressure will continue to build up in chamber 89 until the movable partition 78 is moved back to its neutral or starting position, and the valve 110 is again closed. The air pressure in the chamber 89 can thus be read from the gauge 115.

As the area of that part of the partition 78 enclosed within the chamber 89 is a constant, the force required to restore the tubular shaft 66 and partition 78 to neutral position can be determined from the direct-reading gauge 115, which is suitably calibrated and responds to changes in air pressure. The force thus measured represents the magnitude of the externally-applied force also, which has been determined according to the present invention by creating a balancing force exactly equal to the unknown force and determining the magnitude of the balancing force from known data.

If the liquid level in the ball-float chamber should fall, thus causing lever 28 to raise lever 45 at its point of connection 55, this, in turn, would cause lever 46 to move tubular shaft 66 and partition 78 of the force unit upwardly. Valve 81 would then be unseated, and the air within chamber 89 would be vented to atmosphere through port 80, tube 66 and a pair of vents 126 in the upper end of tube 66. The chamber 89 will continue to vent until the pressure is so reduced that the force applied against partition 78 is equal once again to the force exerted downwardly upon it by tube 66, and thereupon the valve 81 will close. The new pressure reading on gauge 115 will indicate the magnitude of the then applied, external, unknown force (which in the illustration given is the buoyant force of the liquid).

Thus far, for simplicity, the operation has been described without taking into account the liquid-filled chambers 87, 88. It will be understood, of course, that when a downward force acts on the tubular member 66, tending to move the cup-shaped partition 78 downwardly, the effect is to compress bellows 84, 85 and to expand upper bellows 86. This means that the volume of chamber 88 will be decreased, and the volume of chamber 87 will be increased. Thus, before the partition 78 can be moved, some of the liquid from chamber 88 must flow into chamber 87 through channels 91, 92. According to the present invention, the rate of flow is carefully controlled by the adjustable orifice valve 94. It will be understood, of course, that if the valve 94 is set close to its valve seat 95, the flow of liquid from chamber 88 to 87 will be appreciably retarded.

Only a sustained or repetitive force will in fact actually move the partition 78 in one direction or the other. If for instance a pulsating force should be applied to the force system (disregarding for the moment the two liquid-filled chambers communicating through the reduced orifice), each pulsation would immediately move tubular member 66 downwardly, unseat valve 110, admit a jet of air into the compressible fluid chamber 89, and force the partition 78 upwardly. When each pulsation ended, partition 78 would move upwardly (due to the momentary lessening of the applied force), valve 81 would be opened to vent some of the air to atmosphere, and partition 78 would then be moved downwardly again. This cycle would repeat for each pulsation, with obvious disadvantages.

The present invention, which provides the two liquid-filled chambers 87, 88 in communication only through a restricted orifice, creates a means of smoothing out the pulsating force to an effective mean constant force. The gauge 115 will indicate only the mean effective force actually applied against the movable partition, and which is in fact balanced by the air pressure created in chamber 89.

The orifice valve 94 should be adjusted to such a point as to assure smooth action. It is preferable, however, not to restrict the orifice any more than necessary, in order to allow the force system to respond quickly to changes in the applied or unknown force being measured.

The force system of the present invention is adapted to handle a wider range of external forces, while still staying within the customary air pressure limits of from two to fourteen pounds. The range-changing device comprising pivoted levers 45, 46 and their movable fulcrum 50 makes possible a multiplication or division of the applied force to bring it within easy handling range of the force system. Thus, as seen in the three successive vector views of Fig. 10, a 4 to 1, 3 to 1, 2 to 1, etc., ratio of applied force to balancing force may be established by shifting the movable fulcrum element 50 along the knife edges 58. Under such circumstances, if an absolute force value is desired, it will be necessary to multiply the indicated force of gauge 115 by the lever ratio. It is also possible with the present invention to increase further the instrument range by increasing the line air pressure range.

One other advantage which accrues from the range-changing device of the present invention, as applied to a liquid-level instrument, is that it provides a convenient compensating means for changes in specific gravity.

Figure 11:
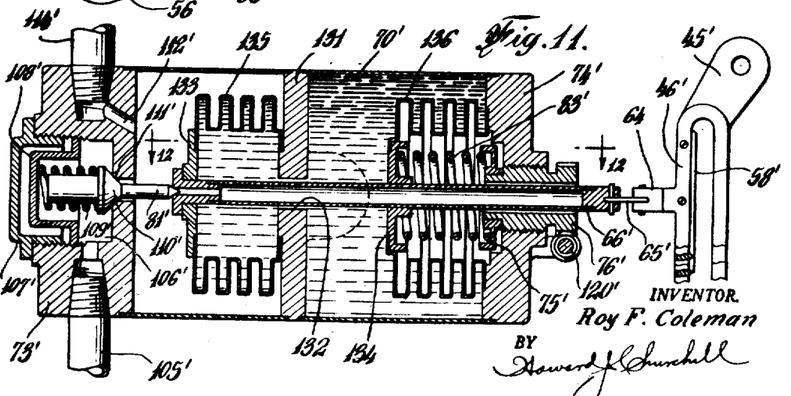
Fig. 11 is a fragmentary, axial, sectional view of a modified form of force system.
Figure 12:
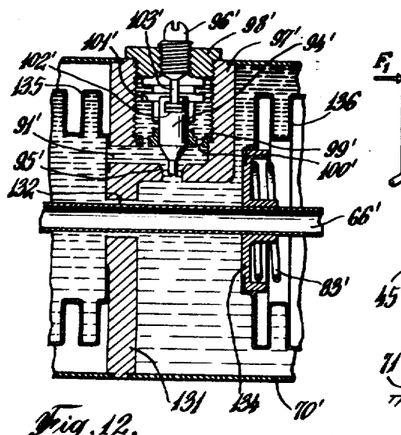
Fig. 12 is an axial sectional view of the modification illustrated in Fig. 11 taken on the line 12—12 in this figure.

In Figs. 11 and 12 there is illustrated a modified form which the force system of the present invention may take. Parts corresponding to like parts in other figures have been similarly marked with prime reference numerals. One disadvantage which the modification has over the force system shown in Fig. 3 is that the unit is less compact; whereas it has the advantage of requiring one less bellows. It functions quite similarly to the embodiment of Fig. 3, with the exception that the two liquid-filled chambers are separated by a fixed partition and their respective volumes are varied by moving their oppositely-disposed end partitions or heads simultaneously toward and away from the central partition.

In the principal embodiment shown in Figs. 3 and 4, it will be remembered that the end partitions are stationary and the central partition is movable, to vary simultaneously the respective volumes of the liquid-filled chambers. A central partition 131 is formed integrally with the cylindrical housing 10'. This partition has an axial hole 132 through which the tubular shaft 66' is slidable. The hole 132 preferably is a running fit within close tolerances so as to limit the seepage of liquid therethrough from chamber 87' to 88'. An adjustable orifice valve 94' establishes communication between the two liquid-filled chambers (Fig. 12). As stated, instead of having a single movable partition such as 78 in Fig. 3, two partition members 133, 134 are formed integrally with the upper and lower bellows 135, 136, are secured to the tubular shaft 66', and movable therewith, in substantially the same way and for the same operational purposes as the partition 78 in Fig. 3.

While the structure has thus far been described for convenience as if there were in fact pronounced relative movements of parts with an increase or decrease in applied force, it should be carefully noted that in practice the movements are kept to a minimum. The valves 81 and 110 require only very small movements to admit air to or exhaust it from the balancing chamber 89. And as soon as a balance is re-established, the parts all occupy fixed relative positions. Mechanical movements are limited to very small fractions of one inch and preferably are less than .002 inch.

While I have shown and described the preferred forms which the invention may assume, it is understood that the invention is not to be limited to the precise embodiments shown, but that variations may be made therein without departing from the spirit of the invention or from the scope of the appended claims.

What I claim is:

1. A force system for opposing an externally-applied unknown force, comprising a casing, a partition in said casing, bellows supporting said partition and defining with it and the casing two concentric expansible and contractible chambers, one of said chambers being liquid filled and the other constituting a pressure-fluid chamber, means associated with said partition for moving the same in response to variations in said unknown force to contract the pressure-fluid chamber with an increase in said force and to permit it to expand with a decrease in said force, the liquid in said liquid-filled chamber being in contact with the bellows of said pressure-fluid chamber, said liquid-filled chamber constituting a damping chamber for damping out pulsations in said force, said liquid being in contact at all times with the bellows constituting the pressure-fluid chamber, and a pilot control having a fluid inlet connected to a source of pressure fluid and a fluid outlet connected to the pressure-fluid chamber, said pilot control being responsive to movements of said partition for causing additional pressure fluid to flow into the pressure-fluid chamber or to be vented therefrom in proportion to the variation in said unknown force.

2. A force system for opposing an externally-applied unknown force, comprising a base, a partition movable relatively to said base, and flexible supporting means defining with said partition and base an expansible and contractible pressure-fluid chamber, means associated with said partition for moving the same in response to variations in said unknown force to contract the pressure-fluid chamber with an increase in said force and to permit the same to expand with a decrease in said force, two liquid-filled expansible and contractible chambers in liquid communication through an orifice, one of said liquid-filled chambers surrounding the pressure-fluid chamber, one of said liquid-filled chambers being caused to contract and the other to expand and liquid to flow therebetween through the reduced orifice simultaneously with movements of said partition, the rate of contraction or expansion of the pressure-fluid chamber being dependent upon the rate of liquid flow between said liquid-filled chambers, and a pilot control having a fluid inlet connected to a source of pressure fluid, a fluid outlet connected to the pressure-fluid chamber, and a valve therebetween, said pilot control being responsive to movements of said partition for causing additional pressure fluid to flow into the pressure-fluid chamber or to be vented therefrom in proportion to the variation in said unknown force.

3. A force system for opposing an externally-applied unknown force, comprising a base, a partition movable relatively to said base, and flexible supporting means defining with said partition and base an expansible and contractible pressure-fluid chamber, means associated with said partition for moving the same in response to variations in said unknown force to contract the pressure-fluid chamber with an increase in said force and to permit the same to expand with a decrease in said force, two liquid-filled expansible and contractible chambers in liquid communication through an orifice, one of said liquid-filled chambers surrounding the pressure-fluid chamber, one of said liquid-filled chambers being caused to contract and the other to expand and liquid to flow therebetween through the reduced orifice simultaneously with movements of said partition, the rate of contraction or expansion of the pressure-fluid chamber being dependent upon the rate of liquid flow between said liquid-filled chambers, means for adjustably varying the orifice opening to vary the rate of liquid flow therebetween, and a pilot control having a fluid inlet connected to a source of pressure fluid, a fluid outlet connected to the pressure-fluid chamber, and a valve therebetween, said pilot control being responsive to movements of said partition for causing additional pressure fluid to flow into the pressure-fluid chamber or to be vented therefrom in proportion to the variation in said unknown force.

4. A force system for opposing an externally-applied unknown force, comprising a casing, a partition longitudinally movable in said casing, a bellows supporting said partition and defining with it and the casing a longitudinally expansible and contractible pressure-fluid chamber, a longitudinally-movable shaft engaging the exterior of said partition and extending through said casing, said shaft adapted to receive the applied force and to transmit the same to the partition to contract the pressure-fluid chamber with an increase in the applied force, while permitting the same to expand with a decrease in applied force, two liquid-filled expansible and contractible chambers in liquid communication through an orifice, each of said chambers having a movable head and a stationary head, said movable heads being oppositely disposed and secured to said longitudinally-movable shaft, whereby one of said liquid-filled chambers is caused to contract and the other to expand and liquid to flow therebetween through the orifice simultaneously with movements of said partition, the rate of movement of said partition being dependent upon the rate of liquid flow between said liquid-filled chambers, and a pilot control having a fluid inlet connected to a source of pressure fluid and a fluid outlet connected to the pressure-fluid chamber, said pilot control responsive to movements of said partition for causing additional pressure fluid to flow into the pressure-fluid chamber or to be vented therefrom in proportion to the variation in applied force.

5. A force system for opposing an externally-applied unknown force, comprising a casing, a partition longitudinally movable in said casing, a bellows supporting said partition and defining with it and the casing a longitudinally expansible and contractible pressure-fluid chamber, a longitudinally-movable tubular shaft engaging the exterior of said partition and extending through said casing, said tubular shaft adapted to receive the applied force and to transmit the same to the partition to contract the pressure-fluid chamber with an increase in the applied force, while permitting the same to expand with a decrease in applied force, a pilot control in said base having a connection to a source of pressure fluid, a fluid passage therefrom communicating with the pressure-fluid chamber, an admission valve controlling said passage adapted to be unseated with the contraction of said chamber, to permit additional fluid to flow into the pressure-fluid chamber in proportion to the increase in applied force, and a vent port in said partition communicating with said tubular shaft and controlled by a second valve, said second valve being adapted to be unseated with the expansion of said chamber and to vent pressure fluid therefrom through said tubular shaft in proportion to the decrease in applied force.

6. A force system for opposing an externally applied unknown force comprising a pair of axially alined bellows, a movable partition jointly secured to the inner ends of said bellows, one of said bellows forming an expansible and contractible compressible fluid chamber, means for rigidly supporting the outer ends of said bellows in axial alinement with one another, means for moving said partition in response to variations in said unknown force to contract said chamber with an increase in said force and to permit it to expand with a decrease in said force, a pilot control having a connection to a source of pressure fluid and a fluid passage therefrom to said chamber, a valve in said passage actuated by said partition and a vent valve actuated by said partition, said pilot control being responsive to movements of said partition to cause additional pressure fluid to flow into said chamber or to be vented therefrom in proportion to variations in said unknown force, and means for maintaining a confined liquid in contact with the surface of each of said bellows.

7. A force system for opposing an externally applied unknown force comprising a pair of axially-alined bellows, a movable partition jointly secured to the inner ends of said bellows, one of said bellows forming an expansible and contractible compressible fluid chamber, a member to support the outer end of said bellows, a support rigidly spaced therefrom for supporting the outer end of said other axially alined bellows, said supports being equidistant from the movable partition, means for moving said partition in response to variations in said unknown force to contract the compressible fluid chamber with an increase in said force and to permit it to expand with a decrease in said force, a pilot control having a connection to a source of pressure fluid and a fluid passage therefrom to said compressible fluid chamber, a valve in said passage actuated by said partition and a vent valve actuated by said partition, said pilot control being responsive to movements of said partition to cause additional pressure fluid to flow into the compressible fluid chamber or to be vented therefrom in proportion to variations in said unknown force, and means for maintaining a confined liquid in contact with the surface of each of said bellows.

8. A force system for opposing an externally applied unknown force comprising a casing having side and end walls, a partition movable in said casing, two axially alined bellows having their inner ends secured to the same intermediate said end walls, one bellows extending toward one of said end walls and the second of said bellows extending toward the opposite end wall and enclosing an expansible and contractible compressible fluid chamber, means for moving said partition in response to variations in said unknown force to contract said chamber with an increase in said force and to permit it to expand with a decrease in said force, a pilot control having a connection to a source of pressure fluid, a fluid passage therefrom to said chamber, a valve in said passage actuated by said partition and a vent valve actuated by said partition, said valve having a seat supported in fixed relation to one of said end walls, said pilot control being responsive to movements of said partition to cause additional pressure fluid to flow into said chamber or to be vented therefrom in proportion to variations in said unknown force, and means for damping the movement of said partition in response to variations in said unknown force comprising a third bellows secured at one end to said partition and at its opposite end to the end wall which is adjacent the compressible fluid chamber and dividing the space within said casing into two liquid filled expansible and contractible chambers, one of said chambers surrounding the compressible fluid chamber, the other of said chambers including a portion surrounding the first of said axially alined bellows, and a restricted passageway placing said two liquid filled chambers in communication with each other.

9. A force system for opposing an externally applied unknown force comprising a casing having side and end walls, a partition movable in said casing, two axially-alined equal-length bellows having their inner ends secured to the same midway between said end walls, one bellows extending to one of said end walls, the second of said bellows extending to the opposite end wall and forming with said partition and said end wall an expansible and contractible compressible fluid chamber, means for moving said partition in response to variations in said unknown force to contract said chamber with an increase in said force and to permit it to expand with a decrease in said force, a pilot control having a connection to a source of pressure fluid, a fluid passage therefrom to the compressible fluid chamber, a valve in said passage actuated by said partition and a vent valve actuated by said partition, said valve having a seat supported in fixed relation to one of said end walls, said pilot control being responsive to movements of said partition to cause additional pressure fluid to flow into the fluid-pressure chamber or to be vented therefrom in proportion to variations in said unknown force, and means for damping the movement of said partition in response to variations in said unknown force comprising a third bellows secured at one end to said partition and at its opposite end to the end wall which is adjacent the compressible fluid chamber and dividing the space within said casing into two liquid filled expansible and contractible chambers, one of said chambers surrounding the compressible fluid chamber, the other of said chambers including a portion surrounding the first of said axially alined bellows, and a restricted passageway placing said two liquid filled chambers in communication with each other.

10. A force system for opposing an externally applied unknown force comprising a casing having side and end walls, a partition movable in said casing, two axially-alined equal-length bellows having their inner ends secured to the same midway between said end walls, one bellows extending to one of said end walls, a cup-like flange on said partition and surrounding said bellows the second of said bellows extending to the opposite end wall and forming with said partition and said end wall an expansible and contractible compressible fluid chamber, means for moving said partition in response to variations in said unknown force to contract said chamber with an increase in said force and to permit it to expand with a decrease in said force, a pilot control having a connection to a source of pressure fluid, a fluid passage therefrom to the compressible fluid chamber, a valve in said passage actuated by said partition and a vent valve actuated by said partition, said valve having a seat supported in fixed relation to one of said end walls, said pilot control being responsive to movements of said partition to cause additional pressure compressible fluid to flow into the fluid chamber or to be vented therefrom in proportion to variations in said unknown force, and means for damping the movement of said partition in response to variations in said unknown force comprising two liquid filled chambers, one surrounding the compressible fluid chamber and one surrounding the first of said axially alined bellows, a restricted passageway for placing said two liquid-filled chambers in communication with each other, said chambers being separated by a third bellows surrounding the compressible fluid chamber and secured at one end to said flange, said flange forming a common partition between said liquid filled chambers having substantially equal areas exposed to the liquids therein.

11. A force system for opposing an externally applied unknown force comprising a casing, two axially alined bellows each fixed at its outer end within said casing and having secured between them a movable member, the interior of one of said bellows being in communication with the exterior of said casing, the second of said bellows enclosing an expansible and contractible compressible fluid chamber, means associated with said member for moving the same in response to variations in said unknown force to contract said chamber with an increase in said force and to permit it to expand with a decrease in said force, a pilot control having a connection to a source of pressure fluid and a fluid passage connected to said second chamber and a valve in said passage and a vent valve for said chamber to vent the same to the exterior of said casing, said valves being actuated by said member, said pilot control being responsive to movements of said member to cause pressure fluid to flow into said chamber or to be vented therefrom in proportion to variations in said unknown force, and means for damping the movement of said member in response to variations in said unknown force comprising a third bellows secured at one end to said movable member and fixed at its opposite end to said casing, said third bellows being disposed in spaced relation to said second bellows and the wall of said casing and dividing the space within said casing into two fluid-filled expansible and contractible chambers, one of said chambers surrounding said second bellows, the other of said chambers including a portion surrounding said first bellows, and a restricted passageway placing said fluid-filled chambers in communication with each other.

12. A force system for opposing an externally applied unknown force comprising a casing, two axially alined bellows each fixed at its outer end within said casing and having secured between them a movable member, the interior of one of said bellows being in communication with the exterior of said casing, the second of said bellows including an expansible and contractible compressible fluid chamber, means associated with said member for moving the same in response to variations in said unknown force to contract said chamber with an increase in said force and to permit it to expand with a decrease in said force, a pilot control having a connection to a source of pressure fluid and a fluid passage connected to said second chamber and a valve in said passage and a vent valve for said chamber to vent the same to the exterior of said casing, said valves being actuated by said member, said pilot control being responsive to movements of said member to cause pressure fluid to flow into said chamber or to be vented therefrom in proportion to variations in said unknown force, and means for damping the movement of said member in response to variations in said unknown force comprising a third bellows secured at one end to said movable member and fixed at its opposite end to said casing, said third bellows being disposed in spaced relation to said axially alined bellows and the wall of said casing and dividing the space between said axially alined bellows and casing into two fluid-filled expansible and contractible chambers, the fluid in one of said chambers being in contact with the walls of said second bellows, a portion of the fluid in the other of said chambers being in contact with said first bellows, and a restricted passageway placing the said fluid-filled chambers in communication with each other.

ROY F. COLEMAN.

REFERENCES CITED

The following references are of record in the file of this patent:

UNITED STATES PATENTS

| Number | Name | Date |
|---|---|---|
| 2,013,222 | Thomas | Sept. 3, 1935 |
| 2,078,106 | Temple | Apr. 20, 1937 |
| 2,229,418 | Mason | Jan. 21, 1941 |
| 1,938,492 | Moller | Dec. 5, 1933 |
| 2,092,844 | Hoekstra | Sept. 14, 1937 |
| 2,248,322 | Annin | July 8, 1941 |
| 1,705,764 | Hilger | Mar. 19, 1929 |
| 333,831 | Corliss | Jan. 5, 1886 |
| 1,976,966 | Royle | Oct. 16, 1934 |
| 1,624,736 | Hutt | Apr. 12, 1927 |
| 1,821,988 | Rowles | Sept. 8, 1931 |
| 2,013,810 | Shimek | Sept. 10, 1935 |
| 1,897,462 | Carter | Feb. 14, 1933 |
| 1,900,291 | Kuhner | Mar. 7, 1933 |
| 2,020,692 | Loudenslager | Nov. 12, 1935 |
| 2,233,227 | Ramey | Feb. 25, 1941 |
| 1,822,578 | Hortvet | Sept. 8, 1931 |
| 2,177,544 | Warner | Oct. 24, 1939 |
| 2,119,955 | Litton | June 7, 1938 |
| 2,252,029 | Pieper | Aug. 12, 1941 |
| 2,299,179 | Rosenberger | Oct. 20, 1942 |
| 1,261,090 | Zisterer | Apr. 2, 1918 |

Certificate of Correction

Patent No. 2,416,570.

February 25, 1947.

ROY F. COLEMAN

It is hereby certified that errors appear in the printed specification of the above numbered patent requiring correction as follows: Column 12, line 14, claim 4, for "outet" read *outlet*; column 13, line 30, claim 8, for "exapansible" read *expansible*; column 14, lines 48 and 49, claim 10, strike out the word "compressible" and insert the same in line 49, same claim, before "fluid" second occurrence; line 58, same claim 10, for "iin" read *in*; and that the said Letters Patent should be read with these corrections therein that the same may conform to the record of the case in the Patent Office.

Signed and sealed this 6th day of May, A. D. 1947.

[SEAL]

LESLIE FRAZER,
*First Assistant Commissioner of Patents.* to variations in said unknown force to contract said chamber with an increase in said force and to permit it to expand with a decrease in said force, a pilot control having a connection to a source of pressure fluid and a fluid passage connected to said second chamber and a valve in said passage and a vent valve for said chamber to vent the same to the exterior of said casing, said valves being actuated by said member, said pilot control being responsive to movements of said member to cause pressure fluid to flow into said chamber or to be vented therefrom in proportion to variations in said unknown force, and means for damping the movement of said member in response to variations in said unknown force comprising a third bellows secured at one end to said movable member and fixed at its opposite end to said casing, said third bellows being disposed in spaced relation to said second bellows and the wall of said casing and dividing the space within said casing into two fluid-filled expansible and contractible chambers, one of said chambers surrounding said second bellows, the other of said chambers including a portion surrounding said first bellows, and a restricted passageway placing said fluid-filled chambers in communication with each other.

12. A force system for opposing an externally applied unknown force comprising a casing, two axially alined bellows each fixed at its outer end within said casing and having secured between them a movable member, the interior of one of said bellows being in communication with the exterior of said casing, the second of said bellows including an expansible and contractible compressible fluid chamber, means associated with said member for moving the same in response to variations in said unknown force to contract said chamber with an increase in said force and to permit it to expand with a decrease in said force, a pilot control having a connection to a source of pressure fluid and a fluid passage connected to said second chamber and a valve in said passage and a vent valve for said chamber to vent the same to the exterior of said casing, said valves being actuated by said member, said pilot control being responsive to movements of said member to cause pressure fluid to flow into said chamber or to be vented therefrom in proportion to variations in said unknown force, and means for damping the movement of said member in response to variations in said unknown force comprising a third bellows secured at one end to said movable member and fixed at its opposite end to said casing, said third bellows being disposed in spaced relation to said axially alined bellows and the wall of said casing and dividing the space between said axially alined bellows and casing into two fluid-filled expansible and contractible chambers, the fluid in one of said chambers being in contact with the walls of said second bellows, a portion of the fluid in the other of said chambers being in contact with said first bellows, and a restricted passageway placing the said fluid-filled chambers in communication with each other.

ROY F. COLEMAN.

REFERENCES CITED

The following references are of record in the file of this patent:

UNITED STATES PATENTS

| Number | Name | Date |
|---|---|---|
| 2,013,222 | Thomas | Sept. 3, 1935 |
| 2,078,106 | Temple | Apr. 20, 1937 |
| 2,229,418 | Mason | Jan. 21, 1941 |
| 1,938,492 | Moller | Dec. 5, 1933 |
| 2,092,844 | Hoekstra | Sept. 14, 1937 |
| 2,248,322 | Annin | July 8, 1941 |
| 1,705,764 | Hilger | Mar. 19, 1929 |
| 333,831 | Corliss | Jan. 5, 1886 |
| 1,976,966 | Royle | Oct. 16, 1934 |
| 1,624,736 | Hutt | Apr. 12, 1927 |
| 1,821,988 | Rowles | Sept. 8, 1931 |
| 2,013,810 | Shimek | Sept. 10, 1935 |
| 1,897,462 | Carter | Feb. 14, 1933 |
| 1,900,291 | Kuhner | Mar. 7, 1933 |
| 2,020,692 | Loudenslager | Nov. 12, 1935 |
| 2,233,227 | Ramey | Feb. 25, 1941 |
| 1,822,578 | Hortvet | Sept. 8, 1931 |
| 2,177,544 | Warner | Oct. 24, 1939 |
| 2,119,955 | Litton | June 7, 1938 |
| 2,252,029 | Pieper | Aug. 12, 1941 |
| 2,299,179 | Rosenberger | Oct. 20, 1942 |
| 1,261,090 | Zisterer | Apr. 2, 1918 |

---

Certificate of Correction

Patent No. 2,416,570.    February 25, 1947.

ROY F. COLEMAN

It is hereby certified that errors appear in the printed specification of the above numbered patent requiring correction as follows: Column 12, line 14, claim 4, for "outet" read *outlet*; column 13, line 30, claim 8, for "exapansible" read *expansible*; column 14, lines 48 and 49, claim 10, strike out the word "compressible" and insert the same in line 49, same claim, before "fluid" second occurrence; line 58, same claim 10, for "iin" read *in*; and that the said Letters Patent should be read with these corrections therein that the same may conform to the record of the case in the Patent Office.

Signed and sealed this 6th day of May, A. D. 1947.

[SEAL]

LESLIE FRAZER,
*First Assistant Commissioner of Patents.*